(12) United States Patent
Johansson et al.

(10) Patent No.: US 8,856,896 B1
(45) Date of Patent: Oct. 7, 2014

(54) TRANSPARENTLY UPDATING USER CREDENTIALS

(75) Inventors: Jesper M. Johansson, Redmond, WA (US); Nishant Mittal, Seattle, WA (US); Darren E. Canavor, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 422 days.

(21) Appl. No.: 13/168,354

(22) Filed: Jun. 24, 2011

(51) Int. Cl.
*G06F 7/04* (2006.01)

(52) U.S. Cl.
USPC .................................................. 726/6

(58) Field of Classification Search
USPC .................................................. 726/6
See application file for complete search history.

(56) References Cited

U.S. PATENT DOCUMENTS

| | | | | |
|---|---|---|---|---|
| 8,094,812 B1* | 1/2012 | Tsang et al. | .................... | 380/28 |
| 2003/0139976 A1* | 7/2003 | Hanai et al. | .................... | 705/26 |
| 2004/0034734 A1* | 2/2004 | Boyer | ......................... | 711/103 |
| 2004/0177353 A1* | 9/2004 | Rao | ............................... | 717/171 |
| 2005/0080686 A1* | 4/2005 | Fallon et al. | .................... | 705/26 |
| 2006/0171523 A1* | 8/2006 | Greenwell | .................... | 379/242 |
| 2009/0094461 A1* | 4/2009 | Tamura | ......................... | 713/181 |

OTHER PUBLICATIONS

Sobel, Jason. "Scaling Out" Pub. Date: Aug. 20, 2008 https://www.facebook.com/note.php?note_id=23844338919, p. 1-7.*

* cited by examiner

*Primary Examiner* — Krista Zele
*Assistant Examiner* — James Forman
(74) *Attorney, Agent, or Firm* — Hope Baldauff, LLC (57) ABSTRACT

A user password is obfuscated using a first obfuscation algorithm and stored. A security module receives a password from a user a first time and, in response thereto, obfuscates the password using a second obfuscation algorithm and stores the obfuscated password. The security module subsequently receives the password from the user a second time. In response thereto, the security module obfuscates the password using the second algorithm a second time and compares the results of the obfuscation with the stored password obfuscated using the second algorithm. If the results of the obfuscation and the stored password obfuscated using the second algorithm match, the security module replaces the stored password obfuscated using the first algorithm with the password obfuscated using the second algorithm. The operations are performed transparently to the user associated with the password.

18 Claims, 8 Drawing Sheets

TRANSPARENTLY UPDATING USER CREDENTIALS

BACKGROUND

Computer operating systems, applications, World Wide Web ("Web") sites, computers, and other types of systems commonly require users to provide credentials in order to gain access to functionality provided by the systems. For instance, a Web site might require a user to provide a username and a password in order to gain access to the functionality provided by the Web site. Other types of credentials might also be required in order to gain access to other types of programs and computing systems.

In many cases, user passwords are stored in a database in an obfuscated form. For instance, in some systems passwords are obfuscated using an obfuscation algorithm and the obfuscated passwords are stored in a database. When a user attempts to access the system, the user provides a password that is obfuscated and compared to the stored obfuscated password. If the obfuscated values match, this indicates that the user has provided the correct password and the user is permitted access to the system. If the obfuscated values do not match, the user is denied access to the system.

From time to time, it may become necessary for a system or application to migrate to a new algorithm for obfuscating passwords. For instance, a previously used algorithm may be found to have flaws that might compromise the integrity of the stored obfuscated passwords. In other cases, the processing capability of available computing resources might advance such that the strength of a previously used algorithm is lowered. Other reasons might also exist for migrating to a new algorithm for obfuscating passwords and other types of user credentials.

It is with respect to these and other considerations that the disclosure made herein is presented.

DETAILED DESCRIPTION

The following detailed description is directed to technologies for transparently updating user credentials. User credentials, such as passwords, are obfuscated utilizing an obfuscation algorithm. The obfuscated user credentials are then stored in a credential store. Utilizing the concepts and technologies disclosed herein, the stored user credentials can be migrated to a new obfuscation algorithm in a manner that is transparent to the users associated with the credentials.

According to aspects presented herein, a user provides credentials to a computing system, application, Web site, operating system, or other type of system or component. The credentials might be provided in the form of a username and password or in another manner. In the case of a password, an obfuscation algorithm is utilized to generate an obfuscated password. The obfuscated password is then stored, such as in a database or other type of credential store. As used herein, the term "password" refers to any data that is utilized to gain access to a computing system, computer program, operating system, or other type of system or component. For instance, the term password encompasses traditional alphanumeric passwords, personal identification numbers ("PINs"), biometric information, and other types of data generally kept secret and utilized to access a computing system, application, or other type of component.

As mentioned briefly above, the user may be requested to provide their password each time the user requests access to the computing system, application, Web site, operating system, or other type of system or component. In order to determine if the user is entitled to access, the password provided by the user is obfuscated and the resulting value is compared to the previously stored obfuscated password. If the computed and previously stored obfuscated values match, this indicates that the user has provided the correct password and the user is permitted access. If the computed and previously stored obfuscated values do not match, the user is denied access to the system.

As also mentioned briefly above, it may become necessary for various reasons for a computer system, application, operating system, or other type of system or component to migrate to a new algorithm for obfuscating passwords. In order to accomplish this, a password is received from a user, such as when the user attempts to login. In response to receiving the password from the user, the password is obfuscated utilizing a previously utilized obfuscation algorithm and compared to a previously obfuscated and stored password for the user. If the computed and previously stored obfuscated values match, this indicates that the user has provided the correct password and the user is permitted to login.

If the computed and previously stored obfuscated values match, the provided password is also obfuscated utilizing the new obfuscation algorithm. The obfuscated password generated using the new obfuscation algorithm is then stored. For instance, the obfuscated password generated using the new obfuscation algorithm might be stored in a temporary location, such as a pending password store. This operation is performed transparently to the user.

Upon a subsequent login attempt by the user, the user is again asked to provide his/her password. In response to receiving the password from the user, the password is obfuscated utilizing the previously utilized obfuscation algorithm and compared to the previously obfuscated and stored password for the user. If the computed and previously stored obfuscated values match, this indicates that the user has provided the correct password and the user is once again permitted to login.

If the computed and previously stored obfuscated values match, the provided password is also obfuscated utilizing the new obfuscation algorithm. The computed obfuscated password is then compared to the obfuscated password generated using the new obfuscation algorithm that was previously stored in the pending password store. If the computed obfuscated password and the previously stored obfuscated password created using the new obfuscation algorithm match, the previously stored password generated with the previous obfuscation algorithm is replaced with the obfuscated password generated with the new obfuscation algorithm. For instance, the obfuscated password created with the previous obfuscation algorithm might be removed from the credential store and replaced with the obfuscated password generated with the new obfuscation algorithm. These operations are also performed transparently to the user. Upon a subsequent login by the user, the new obfuscation algorithm is utilized to determine if the user has provided the correct password.

It should be appreciated that the embodiments disclosed herein might be utilized with any type of computer, computing system, device, Web site, application program, operating system, or other type of system or component that stores and utilizes obfuscated user credentials, such as passwords. Accordingly, although the embodiments disclosed herein are primarily presented in the context of a merchant system that embodies the concepts disclosed herein, the disclosure presented herein is not limited to such an implementation.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
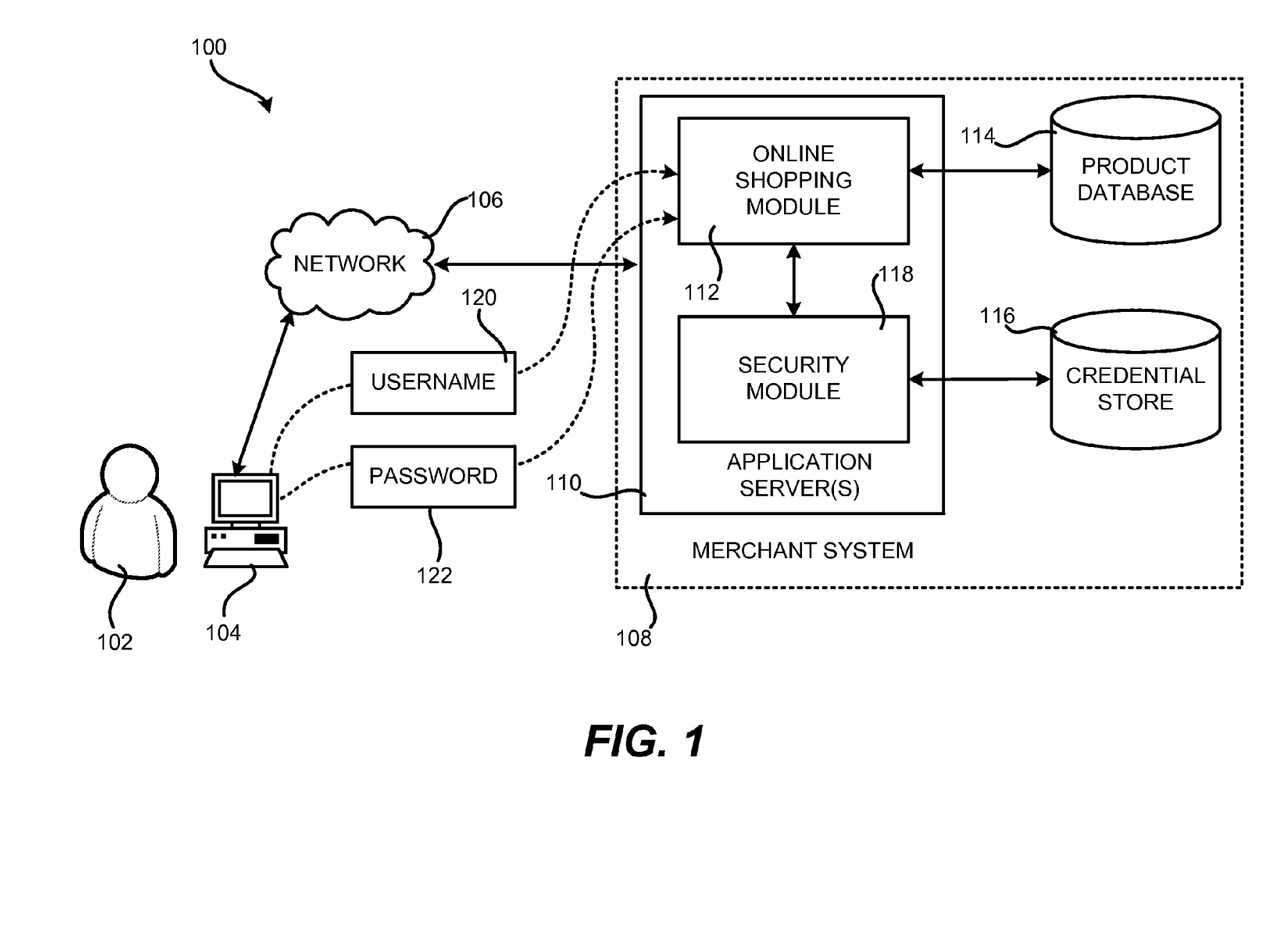
FIG. 1 is a system diagram showing aspects of one illustrative operating environment for implementing the concepts and technologies disclosed herein for transparently updating user credentials.

FIG. 1 and the following description are intended to provide a brief, general description of a suitable computing environment in which the embodiments described herein may be implemented. In particular, FIG. 1 is a system and network diagram that shows an illustrative operating environment 100 including several software components for transparently updating user credentials. As discussed above, the environment 100 is merely illustrative and the embodiments disclosed herein might be utilized in many different types of environments.

The environment 100 includes a customer 102 that uses a customer computer 104 to access a merchant system 108 through a network 106. The customer 102 may be an individual or entity that desires to browse, purchase, or have purchased, one or more products from the online merchant that operates the merchant system 108. The customer computer 104 may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 106 and communicating with the merchant system 108.

The network 106 may be a local-area network ("LAN"), a wide-area network ("WAN"), the Internet, or any other networking topology known in the art that connects the customer computer 104 to the merchant system 108. The merchant system 108 may include a number of application servers 110 that provide various online shopping services to the customer computer 104 over the network 106. The customer 102 may use a client application (not shown) executing on the customer computer 104 to access and utilize the online shopping services provided by the application servers 110.

In one embodiment the client application is a World Wide Web ("Web") browser application, such as the MOZILLA® FIREFOX® Web browser from MOZILLA FOUNDATION of Mountain View, Calif. The Web browser application exchanges data with the application servers 110 in the merchant system 108 using the hypertext transfer protocol ("HTTP") over the network 106. The client application might also be a stand-alone client application configured for communicating with the application servers 110. The client application might also utilize any number of communication methods known in the art to communicate with the merchant system 108 and/or the application servers 110 across the network 106, including remote procedure calls, SOAP-based Web services, remote file access, proprietary client-server architectures, and the like.

The application servers 110 may execute a number of modules in order to provide the online shopping services and the other functionality disclosed herein to the customer computer 104. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides functionality for the customer 102 to browse and purchase products available from the online merchant that operates the merchant system 108. For instance, the online shopping module 112 may retrieve information regarding a particular product offered for sale by the online merchant from a product database 114, generate product details containing the product information, and transmit the product details over the network 106 to the client application executing on the customer computer 104 for display to the customer 102. Information regarding each product offered for sale might be stored in a product database 114 maintained by the merchant system 108.

According to embodiments, the merchant system 108 provides functionality for allowing the customer 102 to create an account for use with the online shopping module. As part of the account creation process, the online shopping module 112 might require the customer to provide information, such as a name, address, contact information, credit card information, and other types of information. The online shopping module 112 might also require the customer 102 to provide credentials, such as a username 120 and password 122. The username 120 uniquely identifies the customer 102. As mentioned briefly above, the password 122 is any data that is utilized to gain access to a computing system, computer program, operating system, or other type of system or component, such as the merchant system 108. The term password encompasses traditional alphanumeric passwords, numeric passwords such as PINs, biometric information, and other types of data generally kept secret and utilized to access a computing system, application, or other type of components like the merchant system 108.

According to one embodiment, the online shopping module 112 operates in conjunction with a security module 118 to obfuscate customer passwords. In other embodiments, the online shopping module 112 or another component or system might perform this functionality. As will be described in greater detail below, the security module 118 obfuscates customer passwords, such as the password 122, and stores the obfuscated passwords in a credential store 116 with the customer username 120. When a customer 102 attempts to login to the merchant system 108, the customer is asked to provide his/her password. The provided password is obfuscated and compared to the obfuscated password stored in the credential store. If the values match, the customer 102 is permitted to login to the merchant system 108. If the values do not match, the customer 102 is not permitted to login. Additional details regarding this process will be provided below with regard to FIGS. 2-3.

Figure 2:
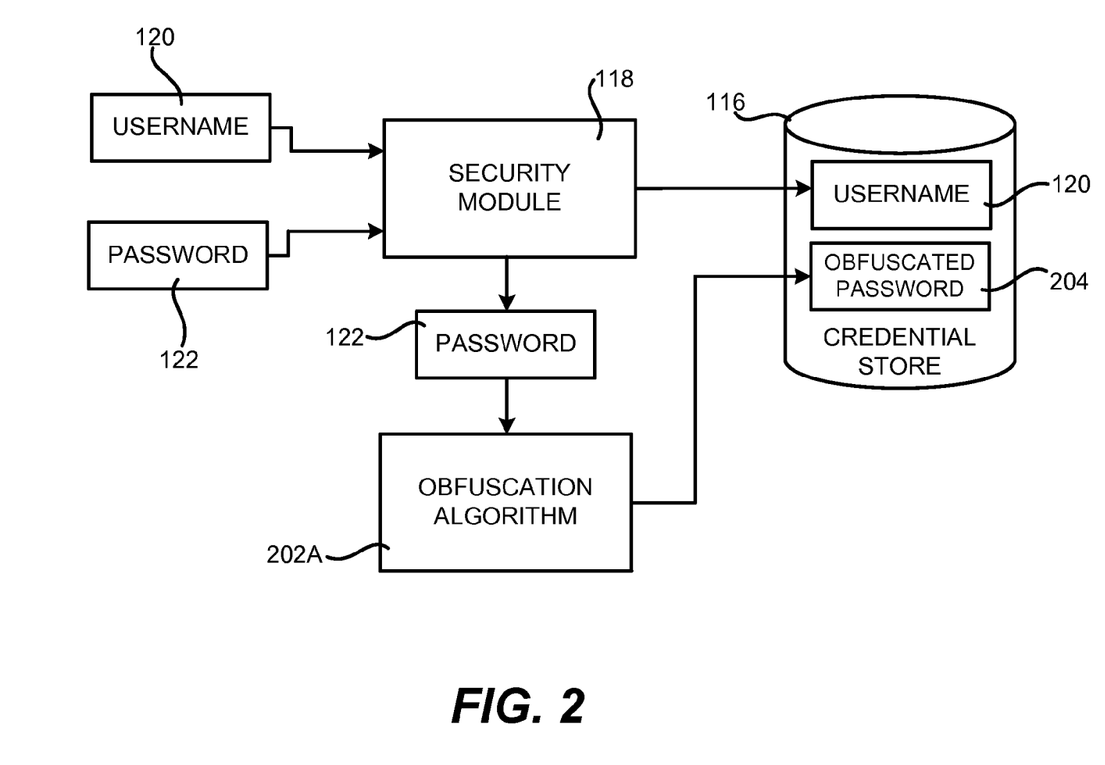
FIG. 2 is a system diagram showing aspects of one mechanism for obfuscating passwords utilized in various embodiments disclosed herein.

FIG. 2 is a system diagram showing aspects of one mechanism for obfuscating passwords, such as the password 122, utilized in various embodiments disclosed herein. As shown in FIG. 2, the security module 118 receives the username 120 and the password 122 in one embodiment. For instance, as discussed above, the customer 102 might provide the username 120 and the password 122 when creating a new account at the merchant system 108. The security module 118 stores the username 120 in the credential store 116. The security module 118 also obfuscates the password 122 and stores the obfuscated password in the credential store 116. The credential store 116 is a database configured to store customer credentials, such as the username 120 and password 122. Various types of database technologies known to those skilled in the art might be utilized to implement the credential store 116.

According to one implementation, the security module 118 utilizes an obfuscation algorithm 202A to obfuscate the password 122. In one embodiment, the obfuscation algorithm comprises a one-way function ("OWF"). As known to those skilled in the art, a OWF is a function that is easy to compute on every input, but hard to invert given the image of a random input. For instance, a cryptographically secure one-way hash function might be utilized as the obfuscation algorithm. The password 122 is utilized in such an embodiment as a key for the encryption of a fixed string. It should be appreciated that other types of obfuscation algorithms and mechanisms might be utilized to obfuscate the password 122.

The obfuscation algorithm 202A receives the password 122 from the security module 118. In response thereto, the obfuscation algorithm 202A generates an obfuscated password 204. The obfuscated password 204 is then stored in the credential store 116 and utilized each time an associated customer 102 attempts to login to the merchant system 108. Additional details regarding this process are illustrated below with regard to FIG. 3.

Figure 3:
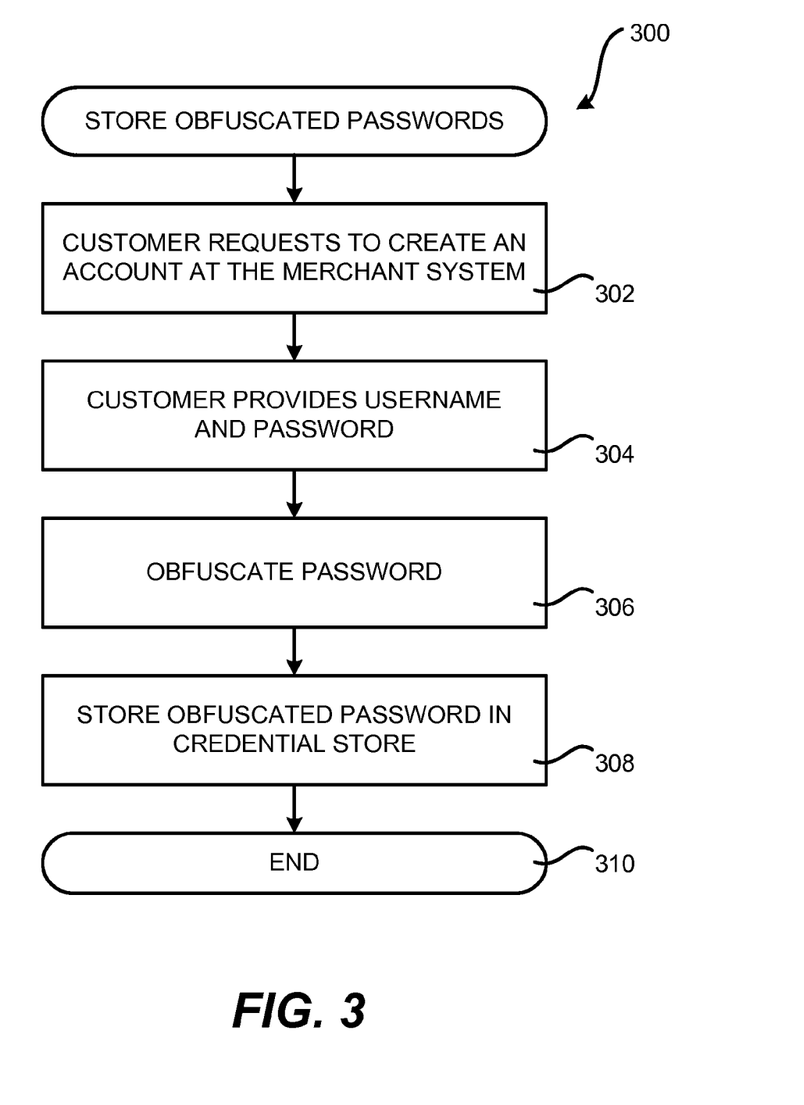
FIG. 3 is a flow diagram showing aspects of one mechanism for obfuscating passwords utilized in various embodiments disclosed herein.

Turning now to FIG. 3, additional details will be provided regarding the embodiments described herein for transparently updating user credentials. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing aspects of one mechanism for obfuscating passwords, such as the password 122, utilized in various embodiments disclosed herein. In particular, FIG. 3 shows a routine 300 for obfuscating passwords and storing the obfuscated passwords, such as in a database like the credential store 116.

The routine 300 begins at operation 302, where a customer requests to create an account at the merchant system 108. In response thereto, the customer 102 is asked to provide credentials, such as the username 120 and the password 122. As mentioned above, the customer 102 might also be asked to provide other information. The customer provides this information at operation 304.

From operation 304, the routine 300 proceeds to operation 306, where the security module 118 utilizes the obfuscation algorithm 202A to obfuscate the password 122 provided by the customer 102 in the manner described above. The obfuscated password 204 is then stored in the credential store 204 at operation 308. The routine 300 proceeds to operation 310, where it ends.

As discussed above, it may become necessary from time-to-time for the security module 118 to migrate to a new algorithm for obfuscating passwords. For instance, the obfuscation algorithm 202A may be found to have flaws that might compromise the integrity of the stored obfuscated passwords 204. In other cases, the processing capability of available computing resources might advance such that the strength of the obfuscation algorithm 202A is lowered. Other reasons might also exist for migrating to a new algorithm for obfuscating passwords and other types of user credentials. FIGS. 4 and 5A-5C illustrate various mechanisms for migrating the obfuscated passwords 204 stored in the credential store 116 to a new obfuscation algorithm in a manner that is transparent to the customer 102.

Figure 4:
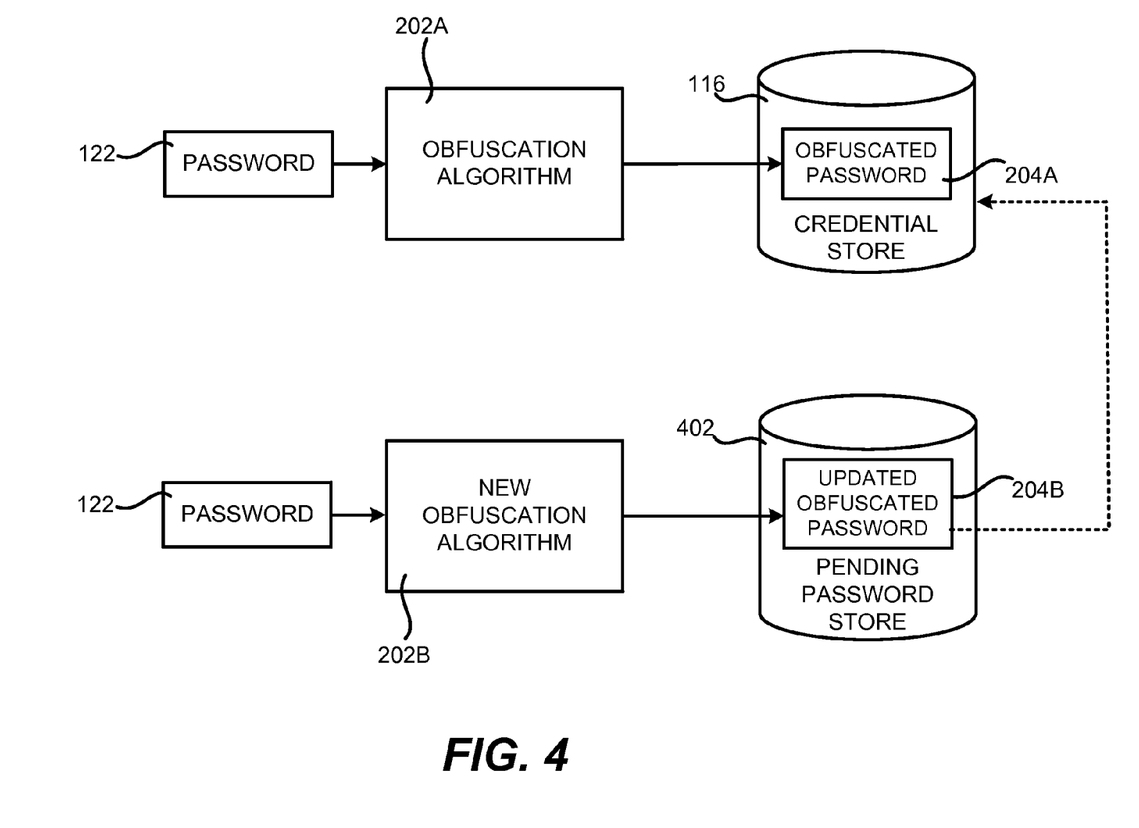
FIG. 4 is a system diagram showing various aspects of one mechanism disclosed herein for transparently updating user credentials.

FIG. 4 is a system diagram showing various aspects of one mechanism disclosed herein for transparently updating user credentials, such as the obfuscated passwords 204 stored in the credential store 116. As described above and illustrated in FIG. 4, an obfuscation algorithm 202A may be utilized to generate an obfuscated password 204A. However, as also discussed above, it may become necessary from time-to-time to migrate to a new obfuscation algorithm, such as the obfuscation algorithm 202B shown in FIG. 4. The obfuscation algorithm 202B might be configured to obfuscate passwords 122 more securely than passwords obfuscated by the obfuscation algorithm 202A.

As will be described in greater detail below, the new obfuscation algorithm 202B may be utilized to obfuscate a password 122 to generate an updated obfuscated password 204B. As will also be described in greater detail below, the updated obfuscated password 204B might be stored in a temporary location, such as a pending password store 402, prior to moving the updated obfuscated password 204B to the credential store 116. According to embodiments, the updated obfuscated password 204B is created and stored in a manner that is transparent to the customer 102 associated with the password 122. Additional details regarding this process are provided below with regard to FIGS. 5A-5C.

Figure 5A:
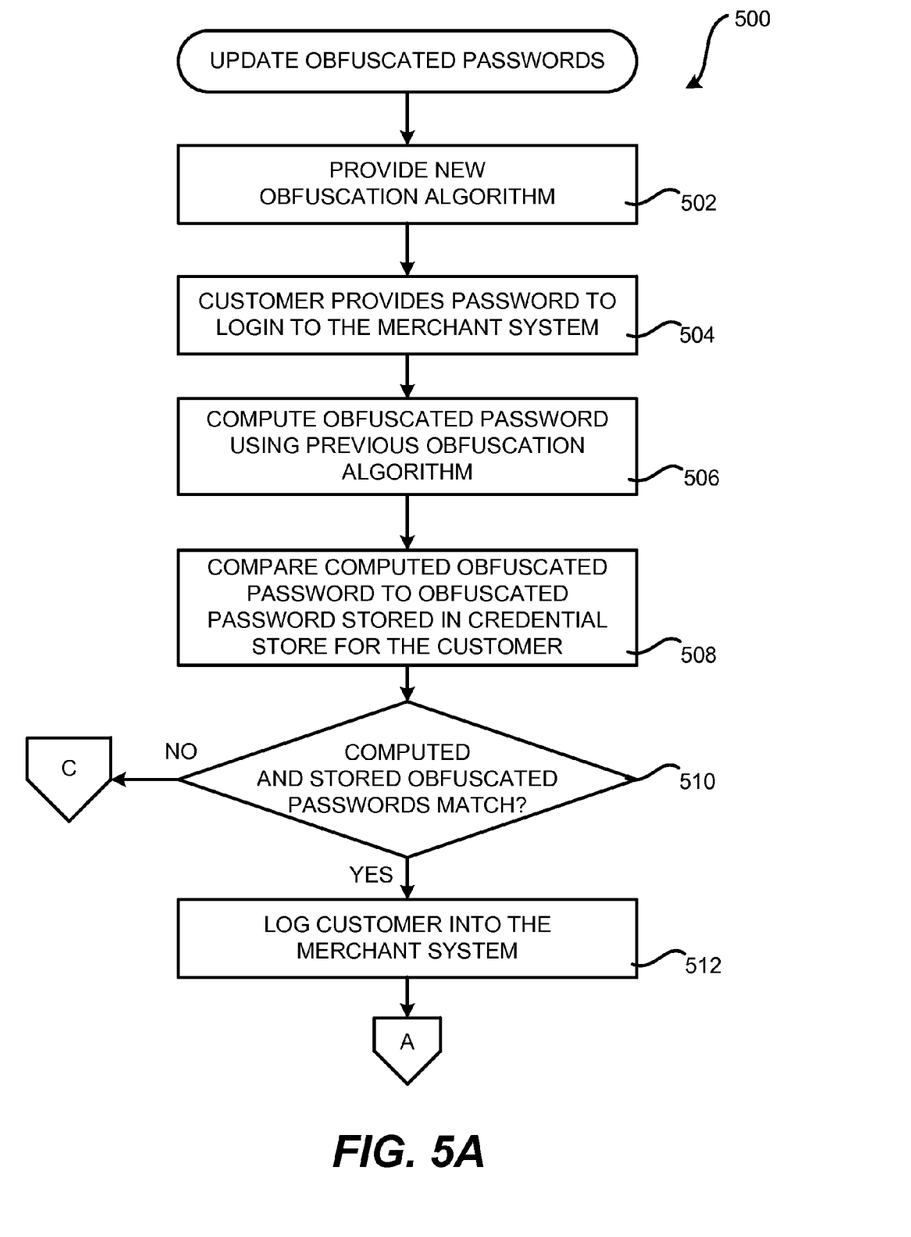
FIGS. 5A-5C are flow diagrams showing one routine for transparently updating stored user credentials according to one embodiment disclosed herein.
Figure 5B:
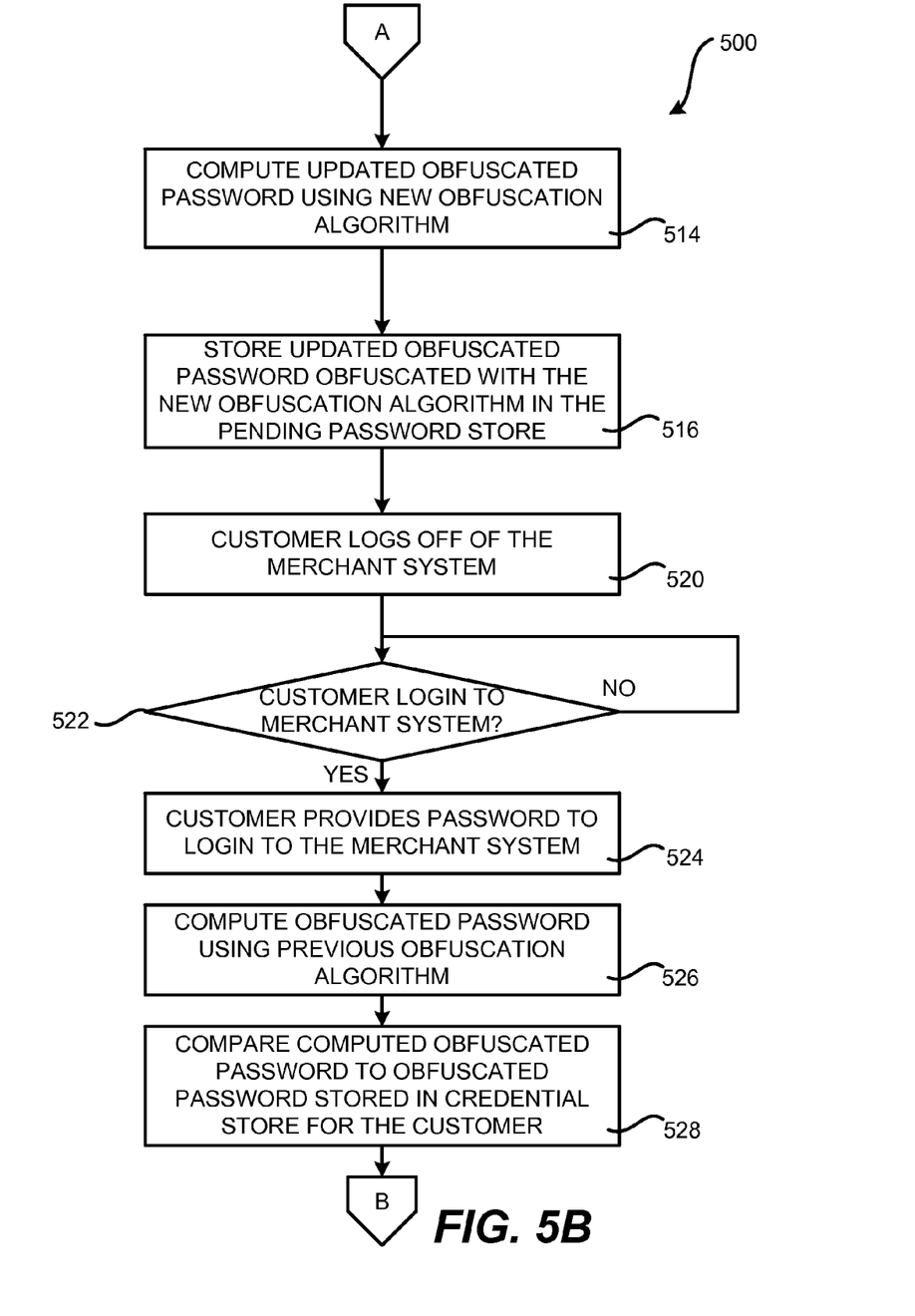
Figure 5C:
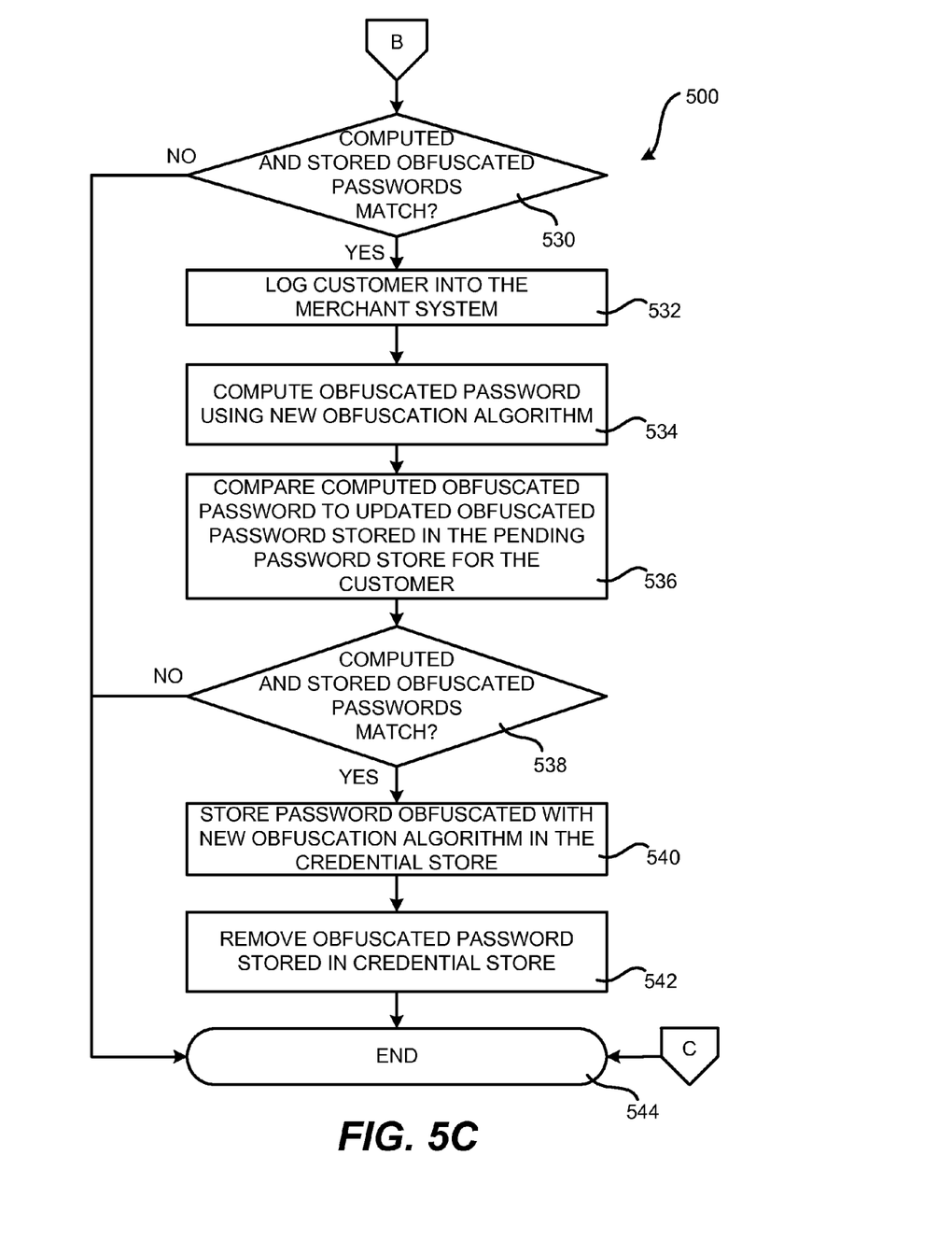

FIGS. 5A-5C are flow diagrams showing one routine 500 for transparently updating stored user credentials, such as a password 122, according to one embodiment disclosed herein. The routine 500 presumes that obfuscated passwords 204A have been created using an obfuscation algorithm 204A and stored in the credential store 116. The routine 500, therefore, illustrates one mechanism for migrating the obfuscated passwords 402A created using the obfuscation algorithm 202A to updated obfuscated passwords 204B created using the new obfuscation algorithm 202B. FIGS. 5A-5C will be described with reference to FIGS. 1 and 4.

The routine 500 begins at operation 502, where the new obfuscation algorithm 202B is provided at the merchant system 108. Appropriate steps may be taken in order to configure the new obfuscation algorithm 202B for use with the security module 118. Once the new obfuscation algorithm 202B has been provided and configured for use, the routine 500 proceeds from operation 502 to operation 504.

At operation 504, the customer 102 requests to login to the merchant system 108 and provides a password 122 in association therewith. In response to receiving the request to login to the merchant system 108, the routine 500 proceeds to operation 506, where the obfuscation algorithm 202A is utilized to obfuscate the password 122 provided by the customer. The routine 500 then proceeds to operation 508, where the obfuscated password is compared to the obfuscated password 204A stored in the credential store 116 for the customer 102. From operation 508, the routine 500 proceeds to operation 510.

At operation 510, the security module 118 determines whether the obfuscated password is identical to the obfuscated password 204A stored in the credential store for the customer 102. If not, the customer 102 might be asked to provide the password 122 again, or the routine 500 may proceed to operation 544, described below, where it ends.

If the obfuscated password matches the obfuscated password 204A stored in the credential store for the customer 102, the routine 500 proceeds from operation 510 to operation 512, where the customer 102 is logged into the merchant system 108. The routine 500 then proceeds to operation 514, where the new obfuscation algorithm 202B is utilized to obfuscate the password 122 to create the updated obfuscated password 204B. As mentioned briefly above, the updated obfuscated password 204B might be stored in a temporary location, such as the pending password store 402. This occurs at operation 516. From operation 516, the routine 500 proceeds to operation 520, where the customer 102 logs off of the merchant system 108.

From operation 520, the routine 500 proceeds to operation 522, where the merchant system 108 determines whether the customer 102 has attempted to login to the merchant system 108 a second time. If so, the routine 500 proceeds from operation 522 to operation 524 where the customer 102 provides the password 122 to login to the merchant system 108. The routine 500 then proceeds to operation 526, where the obfuscation algorithm 202A is again utilized to obfuscate the password 122 provided by the customer. The routine 500 then proceeds from operation 526 to operation 528, where the obfuscated password is compared to the obfuscated password 204A stored in the credential store 116 for the customer 102. From operation 528, the routine 500 proceeds to operation 530.

At operation 530, the security module 118 again determines whether the obfuscated password is identical to the obfuscated password 204A stored in the credential store for the customer 102. If not, the customer 102 might be asked to provide the password 122 again, or the routine 500 may proceed to operation 544, described below, where it ends. If the obfuscated password matches the obfuscated password 204A stored in the credential store for the customer 102, the routine 500 proceeds from operation 530 to operation 532, where the customer 102 is logged into the merchant system 108.

From operation 532, the routine 500 then proceeds to operation 534, where the new obfuscation algorithm 202B is utilized to obfuscate the password 122 provided by the customer 102 to create an updated obfuscated password 204B. The routine 500 then proceeds to operation 536, where the computed updated obfuscated password is compared to the updated obfuscated password 204B stored in the pending password store 402 for the user. If the computed and stored updated obfuscated passwords do not match, the routine 500 proceeds to operation 544, where it ends. If, however, the computed and stored updated obfuscated passwords 204B do match, the routine 500 proceeds from operation 538 to operation 540.

At operation 540, the updated obfuscated password 204B is copied from the pending password store 402 to the credential store 116. The updated obfuscated password 204B might also then be removed from the pending password store 402. From operation 540, the routine 500 proceeds to operation 542, where the obfuscated password 204A is removed from the credential store 116. From operation 542, the routine 500 proceeds to operation 544, where it ends.

In view of the above, it should be appreciated that a mechanism has been presented herein for updating a password created using a first obfuscation algorithm to a second obfuscation algorithm. This process is performed in a secure manner by requiring a user to provide his/her password two times. Additionally, the user's credentials are updated for use with the new obfuscation algorithm in a manner that is transparent to the user. It should be appreciated that the embodiments described above are merely illustrative and that other implementations may be apparent to those skilled in the art.

Figure 6:
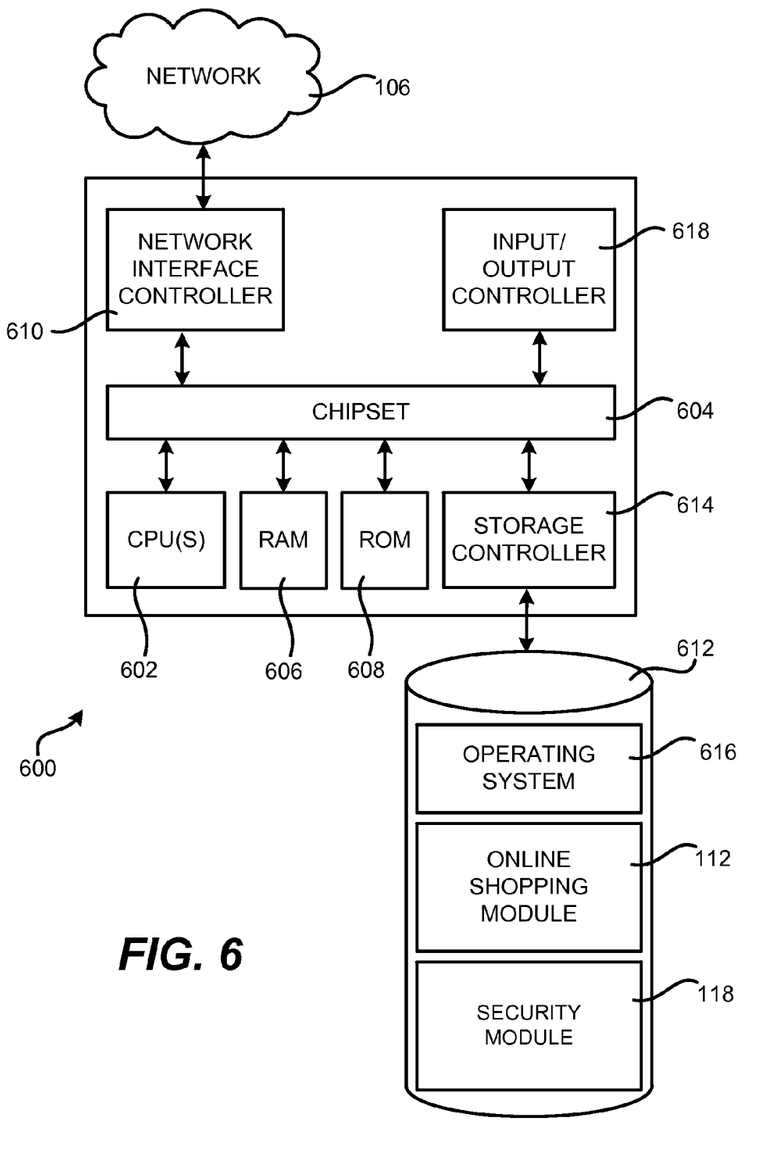
FIG. 6 is a computer architecture diagram showing one illustrative computer hardware architecture for use in computing devices configured to implement the concepts and technologies disclosed herein in one embodiment.

FIG. 6 shows an example computer architecture for a computer 600 capable of executing the software components described herein for transparently updating user credentials in the manner presented above. The computer architecture 600 shown in FIG. 6 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the customer computer 104, or other computing platform.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 602 operate in conjunction with a chipset 604. The CPUs 602 are standard programmable processors that perform arithmetic and logical operations necessary for the operation of the computer 600.

The CPUs 602 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 604 provides an interface between the CPUs 602 and the remainder of the components and devices on the baseboard. The chipset 604 may provide an interface to a random access memory ("RAM") 606, used as the main memory in the computer 600. The chipset 604 may further provide an interface to a computer-readable storage medium such as a read-only memory ("ROM") 608 or non-volatile RAM ("NVRAM") for storing basic routines that help to startup the computer 600 and to transfer information between the various components and devices. The ROM 608 or NVRAM may also store other software components necessary for the operation of the computer 600 in accordance with the embodiments described herein.

According to various embodiments, the computer 600 may operate in a networked environment using logical connections to remote computing devices and computer systems through a network, such as a local-area network ("LAN"), a wide-area network ("WAN"), the Internet, or any other networking topology known in the art that connects the computer 600 to remote computers. The chipset 604 includes functionality for providing network connectivity through a network interface controller ("NIC") 610, such as a gigabit Ethernet adapter. For example, the NIC 610 may be capable of connecting the computer 600 to other computing devices, such as the application servers 110, the customer computer 104, a data storage system in the merchant system 108, and the like, over the network 106 described above in regard to FIG. 1. It should be appreciated that multiple NICs 610 may be present in the computer 600, connecting the computer to other types of networks and remote computer systems.

The computer 600 may be connected to a mass storage device 612 that provides non-volatile storage for the computer. The mass storage device 612 may store system programs, application programs, other program modules, and data, which have been described in greater detail herein. The mass storage device 612 may be connected to the computer 600 through a storage controller 614 connected to the chipset 604. The mass storage device 612 may consist of one or more physical storage units. The storage controller 614 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 600 may store data on the mass storage device 612 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 612 is characterized as primary or secondary storage, or the like. For example, the computer 600 may store information to the mass storage device 612 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the physical storage units.

In addition to the mass storage device 612 described above, the computer 600 might have access to other computer-readable media to store and retrieve information, such as program modules, data structures, or other data. It should be appreciated by those skilled in the art that computer-readable media can be any available media that may be accessed by the computer 600, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 612 may store an operating system 616 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 612 may store other system or application programs and data utilized by the computer 600, such as the online shopping module 112 and/or the security module 118, both of which were described above.

In one embodiment, the mass storage device 612 or other computer-readable storage media may be encoded with computer-executable instructions that, when loaded into the computer 600, transform the computer from a general-purpose computing system into a special-purpose computer capable of implementing the embodiments described herein. These computer-executable instructions transform the computer 600 by specifying how the CPUs 602 transition between states, as described above. According to one embodiment, the computer 600 has access to computer-readable storage media storing computer-executable instructions that, when executed by the computer, perform the various routines and operations described herein.

The computer 600 may also include an input/output controller 618 for receiving and processing input from a number of input devices, such as a keyboard, a mouse, a touchpad, a touch screen, an electronic stylus, or other type of input device. Similarly, the input/output controller 618 may provide output to a display device, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for transparently updating user credentials, such as passwords, have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of updating a stored obfuscated password, the computer-implemented method comprising executing instructions in a computing system to perform the operations of:
    receiving a password from a user in conjunction with a request to login to the computing system, obfuscating the password using an obfuscation algorithm to generate an obfuscated password, determining whether the obfuscated password matches a previously stored obfuscated password for the user, and in response to determining that the obfuscated password matches the previously stored obfuscated password, obfuscating the password with a second obfuscation algorithm to generate an updated obfuscated password, and storing the updated obfuscated password; and
    receiving a second password from the user in conjunction with a second request to login to the computing system after the user has logged out of the computing system, obfuscating the second password using the obfuscation algorithm to generate an obfuscated second password, determining whether the obfuscated second password matches the previously stored obfuscated password, and in response to determining that the obfuscated second password matches the previously stored obfuscated password, obfuscating the second password with the second obfuscation algorithm to generate a second updated obfuscated password, determining whether the second updated obfuscated password matches the stored updated obfuscated password and, replacing the previously stored obfuscated password with the updated obfuscated password in response to determining that the second updated obfuscated password matches the stored updated obfuscated password.

2. The computer-implemented method of claim 1, wherein the updated obfuscated password is stored in a temporary location prior to replacing the previously stored obfuscated password with the updated obfuscated password.

3. The computer-implemented method of claim 1, wherein the previously stored obfuscated password is stored in a credential store.

4. The computer-implemented method of claim 3, wherein replacing the previously stored obfuscated password with the updated obfuscated password comprises removing the previously stored obfuscated password from the credential store and storing the updated obfuscated password in the credential store.

5. The computer-implemented method of claim 1, further comprising logging the user into the computing system in response to determining that the obfuscated password matches the previously stored obfuscated password.

6. The computer-implemented method of claim 1, further comprising logging the user into the computing system in response to determining that the obfuscated second password matches the previously stored obfuscated password.

7. A computer-readable storage medium having computer-executable instructions stored thereupon which, when executed by the computer, cause the computer to:
    store a password for a user that is obfuscated utilizing a first obfuscation algorithm;
    receive the password from the user in conjunction with a request to login to a computing system and, in response thereto, to obfuscate the password using a second obfuscation algorithm and to store the obfuscated password generated using the second obfuscation algorithm; and to
    receive the password from the user a second time in conjunction with a second request to login to the computing system after the user has logged out of the computing system and, in response thereto, to obfuscate the password using the second obfuscation algorithm, to determine if the results of the obfuscation match the stored obfuscated password generated using the second obfuscation algorithm and, if the results of the obfuscation and the stored obfuscated password generated using the second obfuscation algorithm match, then replace the stored password obfuscated utilizing the first obfuscation algorithm with the obfuscated password generated using the second obfuscation algorithm.

8. The computer-readable storage medium of claim 7, wherein the obfuscated password generated using the second algorithm is stored in a temporary location prior to replacing the stored password obfuscated utilizing the first obfuscation algorithm with the obfuscated password generated using the second obfuscation algorithm, and wherein the password obfuscated utilizing the first obfuscation algorithm is stored in a credential store.

9. The computer-readable storage medium of claim 8, wherein replacing the stored password obfuscated utilizing the first obfuscation algorithm with the obfuscated password generated using the second obfuscation algorithm comprises removing the password obfuscated utilizing the first obfuscation algorithm from the credential store and storing the obfuscated password generated using the second obfuscation algorithm in the credential store.

10. The computer-readable storage medium of claim 7, having further computer-executable instructions stored thereupon which, when executed by the computer, cause the computer to:
    obfuscate the password with the first obfuscation algorithm in response to receiving the password from the user;
    determine if the results of the obfuscation of the password match the stored password for the user obfuscated utilizing the first obfuscation algorithm; and to log the user into the computer in response to determining that the results of the obfuscation match the stored password for the user obfuscated utilizing the first obfuscation algorithm.

11. The computer-readable storage medium of claim 7, having further computer-executable instructions stored thereupon which, when executed by the computer, cause the computer to:

obfuscate the password with the first obfuscation algorithm in response to receiving the password from the user the second time;

determine if the results of the obfuscation of the password match the stored password for the user obfuscated utilizing the first obfuscation algorithm; and to log the user into the computer in response to determining that the results of the obfuscation match the stored password for the user obfuscated utilizing the first obfuscation algorithm.

12. A system for updating a stored obfuscated password, the system comprising:

at least one computer configured to store a password obfuscated using a first algorithm for a user and configured to execute a security module, the security module configured to receive the password from the user a first time in conjunction with a request to login to a computing system executing on the at least one computer and, in response thereto, to obfuscate the password using a second algorithm and to store the password obfuscated using the second algorithm, and to receive the password from the user a second time in conjunction with a second request to login to the computing system after the user has logged out of the computing system and, in response thereto, to obfuscate the password using the second algorithm a second time, to compare the results of the obfuscation with the stored password obfuscated using the second algorithm, and to replace the stored password obfuscated with the first algorithm with the password obfuscated with the second algorithm if the results of the obfuscation and the stored password obfuscated using the second algorithm match.

13. The system of claim 12, wherein the computing system executing on the at least one computer comprises an online shopping module.

14. The system of claim 13, wherein the user is logged into the online shopping module in response to receiving the password from the user the first time.

15. The system of claim 14, wherein the user is logged into the online shopping module in response to receiving the password from the user the second time.

16. The system of claim 12, wherein the system further comprises a credential store configured to store the password obfuscated using a first obfuscation algorithm.

17. The system of claim 16, wherein the system further comprises a pending password store.

18. The system of claim 17, wherein the pending password store is utilized to store the password obfuscated using the second algorithm prior to replacing the stored password obfuscated with the first algorithm with the password obfuscated with the second algorithm.

* * * * *